(12) United States Patent
Ota et al.

(10) Patent No.: US 8,042,661 B2
(45) Date of Patent: Oct. 25, 2011

(54) SHOCK ABSORBER

(75) Inventors: Akihisa Ota, Tokyo (JP); Kenkichi Kon, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 594 days.

(21) Appl. No.: 12/084,703

(22) PCT Filed: Nov. 9, 2006

(86) PCT No.: PCT/JP2006/322788
§ 371 (c)(1),
(2), (4) Date: May 8, 2008

(87) PCT Pub. No.: WO2007/055402
PCT Pub. Date: May 18, 2007

(65) Prior Publication Data
US 2009/0107782 A1    Apr. 30, 2009

(30) Foreign Application Priority Data
Nov. 9, 2005    (JP) ................... 2005-324312

(51) Int. Cl.
*F16F 9/348* (2006.01)
*F16F 13/00* (2006.01)
*F16F 9/34* (2006.01)

(52) U.S. Cl. ............. 188/322.15; 188/282.5; 188/282.6

(58) Field of Classification Search ............... 188/282.5, 188/282.6, 316, 322.15
See application file for complete search history.

(56) References Cited

U.S. PATENT DOCUMENTS

| | | | | |
|---|---|---|---|---|
| 3,791,407 | A * | 2/1974 | Nicholls | 137/512.15 |
| 3,845,782 | A * | 11/1974 | Nicholls et al. | 137/493 |
| 4,972,929 | A * | 11/1990 | Ivers et al. | 188/322.15 |
| 6,318,523 | B1 * | 11/2001 | Moradmand et al. | 188/280 |
| 6,644,445 | B2 * | 11/2003 | Dodge | 188/282.6 |
| 7,694,786 | B2 * | 4/2010 | Asadi et al. | 188/322.15 |
| 2004/0251099 | A1 | 12/2004 | Papp et al. | |
| 2005/0115786 | A1 | 6/2005 | Forster | |

FOREIGN PATENT DOCUMENTS

| | | |
|---|---|---|
| EP | 0 992 705 A2 | 4/2000 |
| EP | 1 538 367 A1 | 6/2005 |
| JP | 65241/1981 | 1/1981 |
| JP | 7-119785 | 5/1995 |
| JP | 11-287282 | 10/1999 |
| JP | 2004-190716 | 7/2004 |

* cited by examiner

*Primary Examiner* — Bradley King
*Assistant Examiner* — Vishal Sahni
(74) *Attorney, Agent, or Firm* — Rabin & Berdo, PC

(57) ABSTRACT

A shock absorber (100) for suppressing vibration in a vehicle includes a valve disk (1) that delimits the interior of a cylinder (40) in which a working fluid is sealed; a first passage (2a), a second passage (2b) and a third passage (2c), which are disposed in series so as to connect pressure chambers (41, 42) delimited by the valve disk (1); a valve body (10) that selectively opens the first passage (2a) and the second passage (2b); a biasing member (15) that biases the valve body (10) in a direction for closing the first passage (2a) against the pressure in one of the pressure chambers (42); and a bypass passage (10a) that connects the first passage (2a) to the third passage (2c) when the valve body (10), having displaced in accordance with the pressure in the one pressure chamber (42) so as to open the first passage (2a), displaces further so as to close the second passage (2b). The bypass passage (10a) is set to have a smaller flow passage area than a flow passage area when the first passage (2a) and the second passage (2b) are both open.

6 Claims, 8 Drawing Sheets

SHOCK ABSORBER

TECHNICAL FIELD

This invention relates to an improvement of a shock absorber.

BACKGROUND ART

A conventional shock absorber comprises a piston that is inserted into a cylinder so as to be free to slide and delineates two oil chambers within the interior of the cylinder, a port that penetrates the piston and is capable of connecting the two oil chambers, a leaf valve laminated onto an outlet opening portion of the port, and a spring that biases the leaf valve in a direction for closing the port outlet opening portion (see JP2004-190716, for example).

In this type of shock absorber, the leaf valve is bent by a differential pressure between the two oil chambers, and the flow area of a passage through which a working fluid passes is determined by the bending amount of the leaf valve. A damping force generated by the shock absorber is determined according to the flow passage area.

DISCLOSURE OF THE INVENTION

When an expansion/contraction speed of the shock absorber is low, or in other words when the piston moves at a low speed, the bending amount of the leaf valve varies according to the piston speed, and therefore the damping characteristic of the shock absorber varies in accordance with the piston speed.

However, when the expansion/contraction speed of the shock absorber increases such that the piston moves at a high speed, a case in which the leaf valve itself moves in an axial direction without bending may occur.

As shown in FIG. 9, when the piston speed increases, the damping force tends to become insufficient, making it impossible to suppress vibration in a vehicle sufficiently, and as a result, passenger comfort in the vehicle may be impaired.

This invention has been designed in consideration of this problem, and it is an object thereof to provide a shock absorber that can improve passenger comfort in a vehicle even when the expansion/contraction speed of the shock absorber is high.

In order to achieve above object, this invention provides a shock absorber for suppressing vibration in a vehicle. The shock absorber comprises a valve disk that delimits an interior of a cylinder in which a working fluid is sealed, a first passage, a second passage and a third passage, which are formed in the valve disk and disposed in series so as to connect pressure chambers delimited by the valve disk, a valve body that is disposed between the first passage and the second passage and selectively opens the first passage and the second passage, a biasing member that biases the valve body in a direction for closing the first passage against a pressure in one of the pressure chambers, and a bypass passage that connects the first passage to the third passage when the valve body, having displaced in accordance with the pressure in the one pressure chamber so as to open the first passage, displaces further so as to close the second passage, wherein the bypass passage is set to have a smaller flow passage area than a flow passage area when the first passage and the second passage are both open.

According to this invention, when the expansion/contraction speed of the shock absorber is high, the valve body displaces in accordance with the pressure in one of the pressure chambers to close the second passage. At this time, the first passage and third passage communicate via the bypass passage. The flow passage area of the bypass passage is smaller than the flow passage area when the first passage and second passage are both open, and therefore, when the valve body closes the second passage, the damping force generated by the shock absorber increases. Hence, even when the expansion/contraction speed of the shock absorber is high, the damping force does not become insufficient, and vibration in the vehicle can be suppressed sufficiently, enabling an improvement in the passenger comfort of the vehicle.

BEST MODES FOR CARRYING OUT THE INVENTION

Embodiments of this invention will be described below with reference to the drawings.

First Embodiment

First, referring to FIGS. 1 to 3, a shock absorber 100 according to a first embodiment of this invention will be described.

Figure 1:
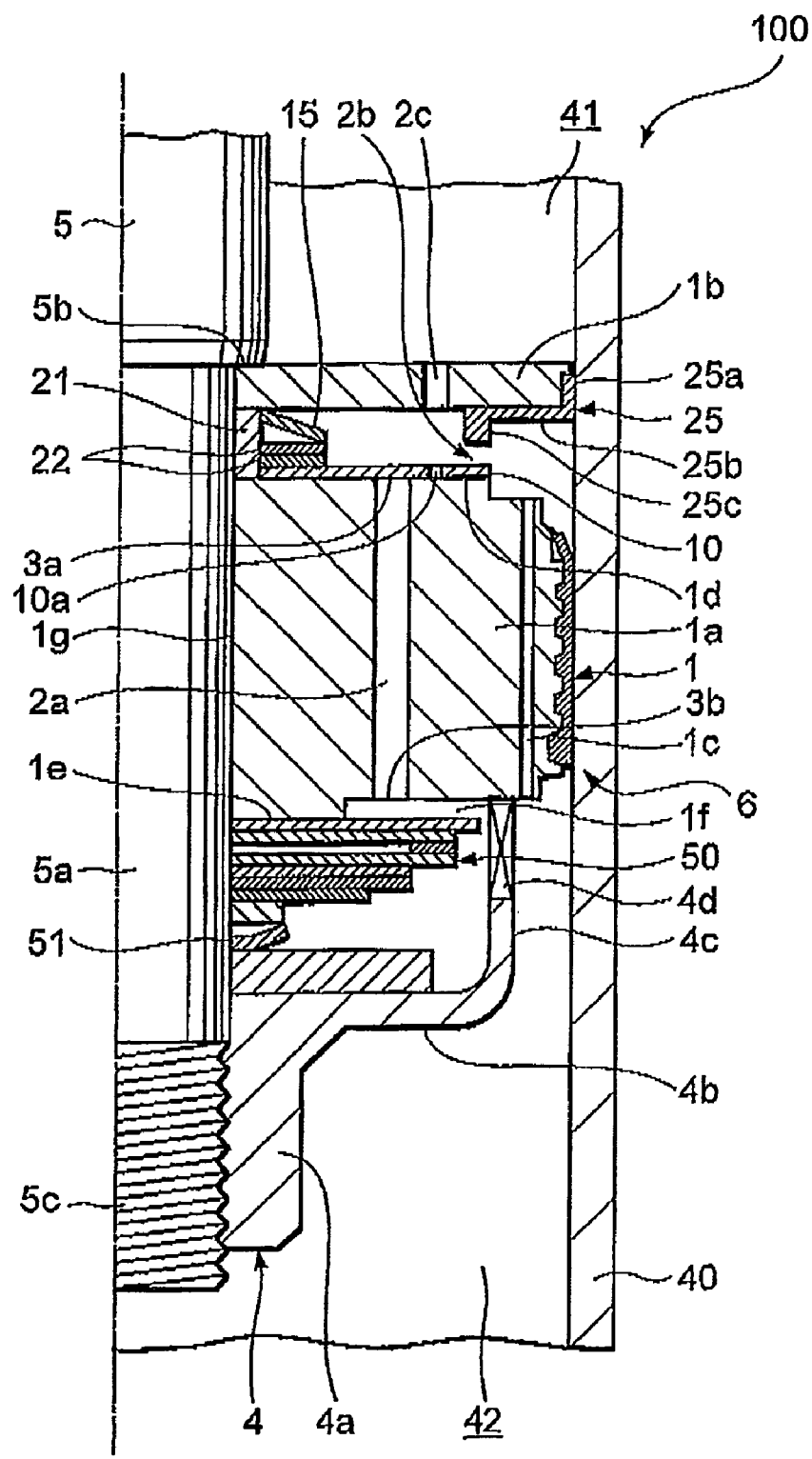
FIG. 1 is a longitudinal sectional view of a shock absorber according to an embodiment of this invention.

The shock absorber 100 is interposed between a vehicle body and an axle of a vehicle in order to suppress vibration in the vehicle body, and as shown in FIG. 1, comprises a cylinder 40 in which a working fluid such as oil is sealed, a piston 1 serving as a valve disk that delineates two pressure chambers 41, 42 within the interior of the cylinder 40 and moves slidingly through the interior of the cylinder 40, and a rod 5, one end of which is connected to the piston 1 and another end of which extends to the exterior of the cylinder 40. A first passage 2$a$, a second passage 2$b$, and a third passage 2$c$ are formed in series in the piston 1 to connect the pressure chambers 41 and 42 and allow the working fluid to pass therethrough. These passages 2$a$, 2$b$, 2$c$ will be described later.

The shock absorber 100 further comprises a leaf valve 10 serving as a valve body capable of opening and closing the first passage 2$a$, and a plate spring 15 serving as a biasing member that biases the leaf valve 10 in a direction for closing the first passage 2a against the pressure in the pressure chamber 42. The leaf valve 10 bends so as to open when the pressure on the pressure chamber 42 side increases above the pressure on the pressure chamber 41 side by a difference of a predetermined value or more.

Further, an air chamber (not shown) that compensates for volumetric change in the cylinder 40, occurring when the rod 5 infiltrates the cylinder 40 or withdraws from the cylinder 40, is provided in the cylinder 40.

Figure 2:
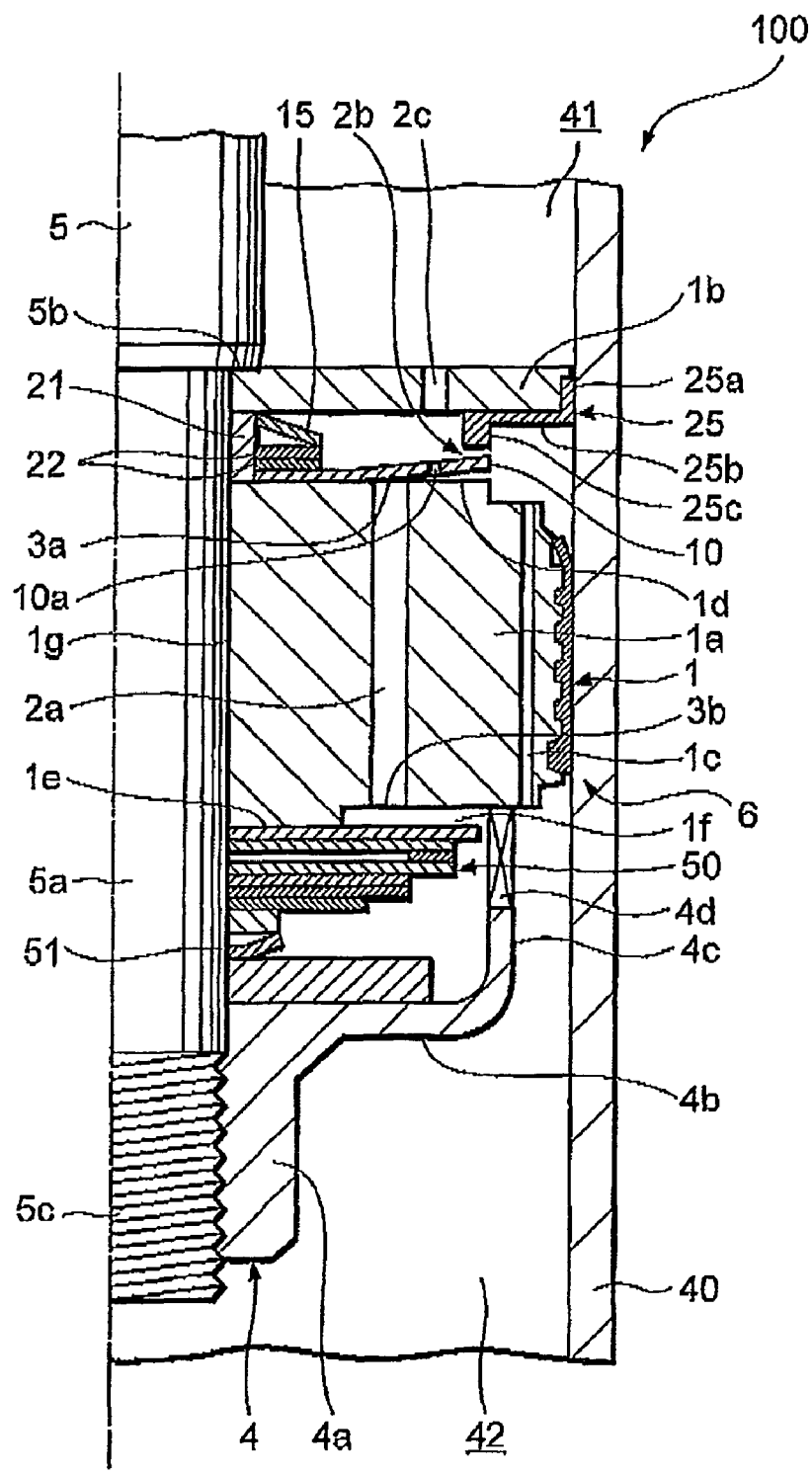
FIG. 2 is a longitudinal sectional view of the shock absorber according to an embodiment of this invention when an expansion/contraction speed of the shock absorber is in a low speed region.
Figure 3:
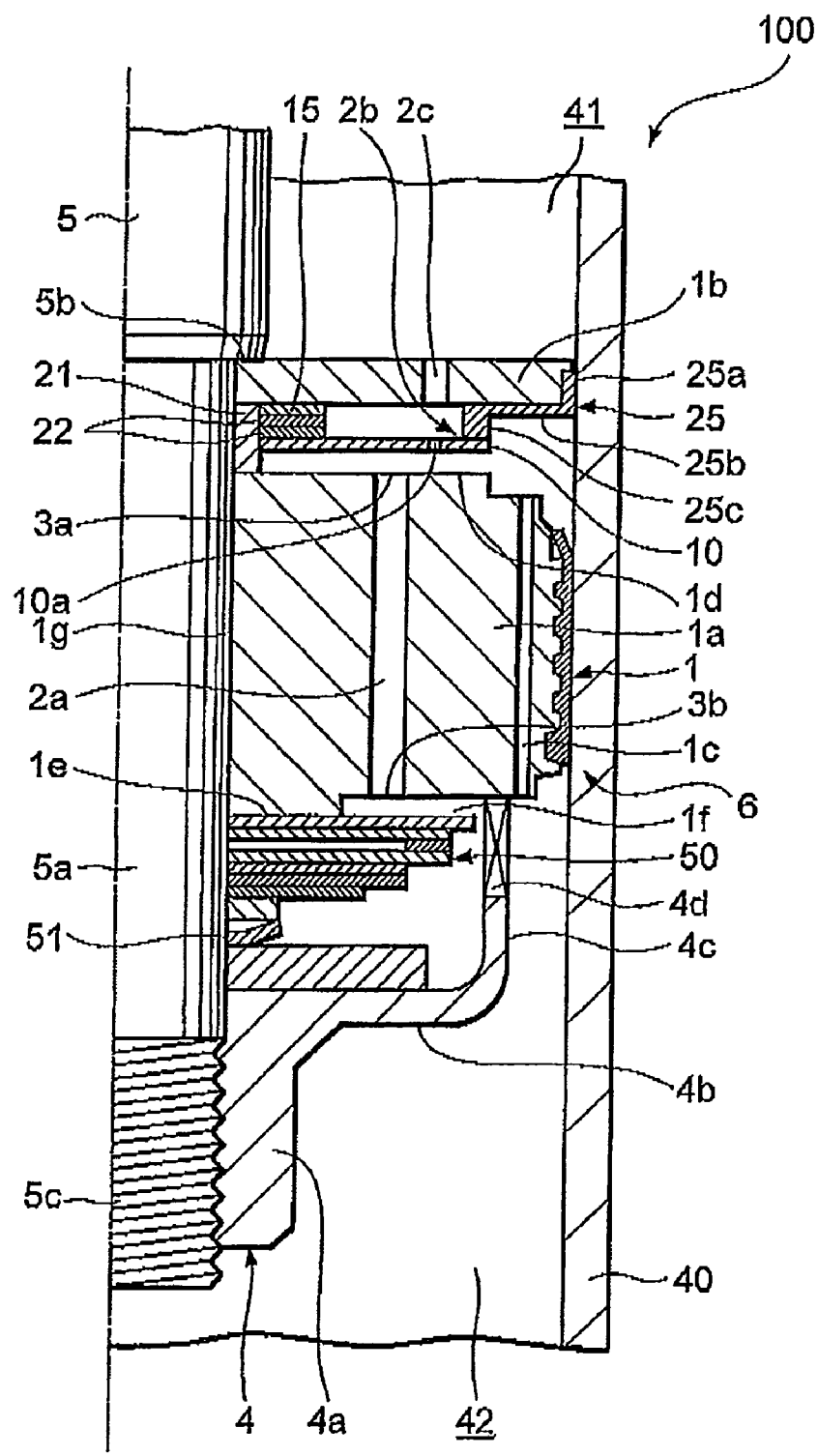
FIG. 3 is a longitudinal sectional view of the shock absorber according to an embodiment of this invention when the expansion/contraction speed of the shock absorber is in a high speed region.

FIGS. 1 to 3 show cross-sections of a structure by which a damping force is generated when the shock absorber 100 performs a contraction operation. When the shock absorber 100 performs a contraction operation such that the pressure in the pressure chamber 42 rises, causing the leaf valve 10 to open, the working fluid in the pressure chamber 42 flows into the pressure chamber 41 through the passages 2a, 2b, 2c. As the working fluid passes through the passages 2a, 2b, 2c, resistance is applied to the working fluid. Hence, the shock absorber 100 generates a damping force through an expansion/contraction operation, and the damping force is determined according to pressure loss generated as the working fluid passes through the passages 2a, 2b, 2c.

When the shock absorber 100 performs a contraction operation, the pressure chamber 42 shifts to the upstream side, and when the shock absorber 100 performs an expansion operation, the pressure chamber 41 shifts to the upstream side. Hereafter, a case in which the shock absorber 100 performs a contraction operation, i.e. a case in which the pressure chamber 42 is on the upstream side, will be described.

Each member of the shock absorber 100 will be described in detail below.

The rod 5 has a small diameter portion 5a on an end portion, and as a result, an annular step portion 5b is formed on the outer periphery of the rod 5.

The piston 1 comprises an annular ring body 1b that is latched to the step portion 5b and fitted onto the outer periphery of the rod 5, and a piston main body 1a, which is a substantially cylindrical member having an axially central through hole 1g that is penetrated by the rod 5.

The first passage 2a penetrates the piston main body 1a and is formed parallel with an axial direction of the rod 5. A choke passage 1c formed parallel with the axial direction of the rod 5 so as to bypass the first passage 2a is also formed in the piston main body 1a. It should be noted that the first passage 2a and the choke passage 1c may be formed in a plurality in the piston main body 1a. Although not shown in the drawing, a passage that allows the working fluid to flow from the pressure chamber 41 into the pressure chamber 42 when the shock absorber 100 performs an expansion operation is formed in the piston main body 1a in addition to the first passage 2a.

The annular leaf valve 10 is disposed on an end face 1d of the piston main body 1a opposing the ring body 1b so as to close an opening portion 3a of the first passage 2a. By means of the end face 1d of the piston main body 1a and the leaf valve 10, the flow of working fluid into the first passage 2a can be blocked, and therefore the end face 1d of the piston main body 1a functions as a valve seat and corresponds to a first seat surface. It should be noted that the leaf valve 10 is disposed so as not to close the choke passage 1c.

The ring body 1b is provided at a predetermined gap from the leaf valve 10 by a tubular spacer 21 fitted onto the outer periphery of the rod 5. The gap delimited between the ring body 1b and the leaf valve 10 serves as the second passage 2b. When the first passage 2a is closed by the leaf valve 10, the second passage 2b is in constant communication with the pressure chamber 42 via the choke passage 1c.

The third passage 2c penetrates the ring body 1b and is formed parallel with the axial direction of the rod 5. Thus, the third passage 2c connects the pressure chamber 41 to the second passage 2b.

As described above, the first passage 2a, second passage 2b and third passage 2c are formed in series in the piston 1 so as to connect the pressure chamber 41 and the pressure chamber 42 delimited by the piston 1.

An annular washer 22 having a smaller diameter than the leaf valve 10 and the annular plate spring 15 are laminated between the ring body 1b and the leaf valve 10 on the outer periphery of the spacer 21. As will be described below, the piston main body 1a is fixed to the outer periphery of the rod 5, and therefore the plate spring 15 is compressed between the ring body 1b and the leaf valve 10 so as to bias the leaf valve 10 in a direction for closing the opening portion 3a of the first passage 2a. The biasing force of the plate spring 15 can be adjusted according to the number and thickness of the washer 22.

A male screw portion 5c is formed on the tip end of the small diameter portion 5a of the rod 5, and a nut 4 for fixing various members to the rod 5 is screwed to the male screw portion 5c. The nut 4 is constituted by a main body 4a formed with a female screw that is screwed to the male screw portion 5c of the rod 5, a flange portion 4b formed on the piston 1 side of the main body 4a, and a tubular portion 4c that extends from an outer peripheral edge of the flange portion 4b toward the piston 1.

The shock absorber 100 is constructed by first inserting the ring body 1b from the tip end portion of the rod 5 and latching it to the step portion 5b of the rod 5, and then inserting the spacer 21, plate spring 15, washer 22, leaf valve 10, and piston main body 1a in order and fitting them to the outer periphery of the rod 5. Finally, the nut 4 is screwed to the male screw portion 5c of the rod 5 projecting from the piston main body 1a, and tightened. When the nut 4 is tightened, the end portion of the tubular portion 4c of the nut 4 comes into contact with the end face of the piston main body 1a, and as a result, the piston 1 is sandwiched between the nut 4 and the step portion 5b of the rod 5.

Thus, a piston assembly 6 constituted by the piston 1 and the other members is fixed to the tip end of the rod 5. A plurality of opening portions 4d are formed in the tubular portion 4c of the nut 4, and the pressure chamber 42 communicates with the interior of the tubular portion 4c through these opening portions 4d.

A laminated leaf valve 50 capable of opening and closing an expansion side passage (not shown) that allows the working fluid to flow therethrough when the shock absorber 100 performs an expansion operation is disposed on an end face 1e of the piston main body 1a not opposing the ring body 1b. The laminated leaf valve 50 is biased toward the piston main body 1a by a plate spring 51 such that when the pressure in the pressure chamber 41 becomes larger than the pressure in the pressure chamber 42 during expansion of the shock absorber 100 and the resulting differential pressure reaches a set value, an outer peripheral side thereof bends, thereby opening the expansion side passage. The laminated leaf valve 50 and the plate spring 51 are sandwiched between the main body 4a of the nut 4 and the piston main body 1a and thereby fixed to the rod 5.

A partially cut-away groove portion 1f is formed in the end face 1e of the piston main body 1a, and an upstream side opening portion 3b of the first passage 2a communicates with the groove portion 1f. Therefore, the opening portion 3b of the first passage 2a is in constant communication with the pressure chamber 42 without being closed by the laminated leaf valve 50.

An annular dam portion 25 that contacts the inner periphery of the cylinder 40 slidingly and projects toward the leaf valve 10 is attached to the outer peripheral side of the ring body 1b.

The dam portion 25 comprises a fitting portion 25a that is fitted to the outer periphery of the ring body 1b and contacts the inner periphery of the cylinder 40 slidingly, a collar portion 25b that extends along the surface of the ring body 1b that opposes the leaf valve 10, and an annular projecting portion 25c that projects toward the leaf valve 10. The projecting portion 25c is positioned further toward the outer peripheral side than the third passage 2c formed in the ring body 1b.

The outer periphery of the fitting portion 25a contacts the inner periphery of the cylinder 40 slidingly. Therefore, to reduce sliding resistance, the dam portion 25 is preferably formed from synthetic resin.

As described above, the leaf valve 10 is supported on the inner peripheral side by the plate spring 15 and the washer 22. When a differential pressure between the pressure in the upstream side first passage 2a and the pressure in the downstream side second passage 2b exceeds a predetermined value, the outer peripheral side of the leaf valve 10 bends so as to separate from the valve seat 1d of the piston main body 1a, and as a result, the leaf valve 10 opens. In other words, the opening portion 3a of the first passage 2a is opened. It should be noted that although the leaf valve 10 is constituted by a single leaf in the figure, it may be constituted by a plurality of laminated leaves.

A through hole 10a penetrating the leaf valve 10 parallel to the axial direction of the rod 5 is provided further toward the outer peripheral side than the position in which the opening portion 3a of the first passage 2a opposes. When the leaf valve 10 is seated on the valve seat 1d, the through hole 10a remains closed and does not communicate with the first passage 2a. It should be noted that the number and opening area of the through hole 10a are determined according to the required damping characteristic of the shock absorber.

When the shock absorber 100 performs a contraction operation such that the piston assembly 6 moves in a direction for reducing the volume of the pressure chamber 42, and the pressure in the pressure chamber 42 rises such that the differential pressure between the upstream side and downstream side of the leaf valve 10 exceeds a predetermined value, i.e. a valve-opening pressure of the leaf valve 10, the outer peripheral side of the leaf valve 10 bends as shown in FIG. 2. As a result, the outer peripheral side of the leaf valve 10 separates from the valve seat 1d of the piston main body 1a so as to open the opening portion 3a of the first passage 2a. The through hole 10a in the leaf valve 10 also opens. In this state, the working fluid in the pressure chamber 42 passes through the opening portion 4d of the nut 4 and the first passage 2a, and flows between the leaf valve 10 and the valve seat 1d through the opening portion 3a of the first passage 2a. The working fluid then flows into the second passage 2b through both an annular gap between the leaf valve 10 and the projecting portion 25c of the dam portion 25 and the through hole 10a, and then flows into the pressure chamber 41 through the third passage 2c in the ring body 1b.

When the speed of the piston assembly 6 during a contraction operation of the shock absorber, or in other words the expansion/contraction speed of the shock absorber 100, reaches or exceeds a predetermined speed, the pressure in the pressure chamber 42 rises rapidly, causing the differential pressure between the upstream side and downstream side of the leaf valve 10 to rise beyond the aforementioned valve-opening pressure. In this case, the entire leaf valve 10 moves away from the piston 1 against the biasing force of the plate spring 15.

The outer diameter of the leaf valve 10 is set to be at least equal to or greater than the inner diameter of the projecting portion 25c of the dam portion 25. Hence, when the leaf valve 10 moves by compressing the plate spring 15, it comes into contact with the end face of the projecting portion 25c of the dam portion 25, as shown in FIG. 3. When the leaf valve 10 comes into contact with the end face of the projecting portion 25c, the annular gap between the leaf valve 10 and the projecting portion 25c closes. In other words, the second passage 2b is closed. The end face of the projecting portion 25c corresponds to a second seat surface.

Therefore, the leaf valve 10 is disposed between the first passage 2a and second passage 2b so as to open the first passage 2a and second passage 2b selectively.

The through hole 10a is positioned so as not to be closed by the projecting portion 25c even when the leaf valve 10 contacts the projecting portion 25c. The through hole 10a is therefore maintained in a communicating state even when the second passage 2b is closed by the movement of the leaf valve 10. Accordingly, the working fluid in the pressure chamber 42 passes through the through hole 10a in the leaf valve 10 and flows into the pressure chamber 41 via the third passage 2c. Thus, the through hole 10a serves as a bypass passage which connects the first passage 2a to the third passage 2c when the leaf valve 10 is displaced in accordance with the pressure in the pressure chamber 42 so as to close the second passage 2b.

The through hole 10a is set with a smaller flow passage area than a flow passage area when both the first passage 2a and second passage 2b are open, and therefore, when the leaf valve 10 closes the second passage 2b, the flow passage area through which the working fluid passes decreases.

In this embodiment, the through hole 10a in the leaf valve 10 is formed with an opening portion in the two opposing end faces of the leaf valve 10. However, the shape of the through hole 10a is not limited to a hole, and may be a notch formed by cutting a part of the outer periphery of the leaf valve 10 into a U shape. Likewise with this shape, the flow passage area can be limited while maintaining communication between the first passage 2a and third passage 2c when the leaf valve 10 comes into contact with the dam portion 25.

Further, the dam portion 25 may be formed integrally with the ring body 1b. Also, the outer periphery of the ring body 1b may be provided in direct sliding contact with the inner periphery of the cylinder 40, the dam portion 25 may be constituted by the annular projecting portion 25c alone, and the projecting portion 25c may be provided on either the ring body 1b or the leaf valve 10.

Further, although the valve seat 1d of the piston main body 1a is shown to be flat in the figure, the valve seat 1d may be tilted toward the outer periphery so as to apply an initial bend to the leaf valve 10 disposed in contact with the valve seat 1d, thereby adjusting the valve-opening pressure.

Also in this embodiment, the plate spring 15 is employed as a biasing member, but any member capable of causing a biasing force to act on the leaf valve 10 may be employed as the biasing member. For example, the biasing member may be constituted by an elastic body such as a coil spring, a leaf spring, a rubber or the like.

Actions of the shock absorber 100 constituted as described above will now be described.

When the shock absorber 100 performs a contraction operation such that the piston assembly 6 moves in a direction for compressing the volume of the pressure chamber 42, the pressure in the pressure chamber 42 rises, as a result of which the working fluid in the pressure chamber 42 attempts to move into the pressure chamber 41.

When the piston speed, i.e. the expansion/contraction speed of the shock absorber, is in a very low speed region, the differential pressure between the pressure chamber 42 and the pressure chamber 41, or in other words the front-rear differential pressure of the leaf valve 10, does not reach the valve-opening pressure at which the outer peripheral side of the leaf valve 10 bends. Therefore, the first passage 2*a* remains closed by the leaf valve 10, as shown in FIG. 1, and the working fluid in the pressure chamber 42 flows into the second passage 2*b* through the choke passage 1*c*. The working fluid then passes through the third passage 2*c* and flows into the pressure chamber 41.

Figure 4:
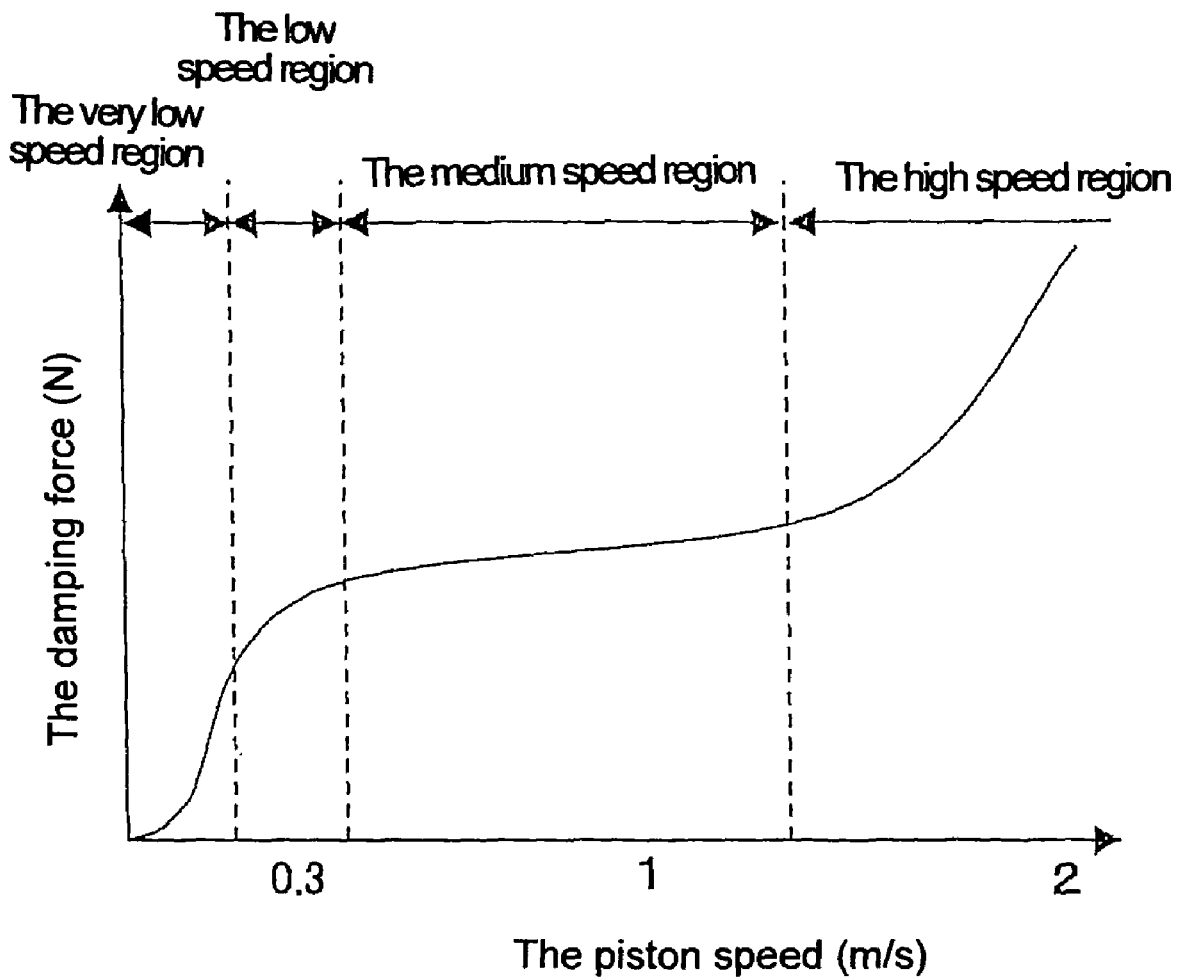
FIG. 4 is a graph showing a damping characteristic of the shock absorber according to an embodiment of this invention.

The damping characteristic (the relationship between piston speed and damping force) at this time is as shown in FIG. 4, where a damping coefficient, which is the rate of increase in the damping force relative to the piston speed, is comparatively large.

By providing the shock absorber 100 with the choke passage 1*c*, the damping coefficient can be made extremely small when the piston speed is extremely low and increased when the piston speed increases, and thus, a damping characteristic whereby the damping force rises rapidly as the piston speed increases can be realized. In other words, the movement of the piston 1 when the shock absorber begins to expand/contract can be made smooth in an extremely low speed region, and in a very low speed region exceeding the extremely low speed region, the damping force can be increased, thereby suppressing vibration in the vehicle body reliably and enabling an improvement in the passenger comfort of the vehicle.

It should be noted that, in place of the choke passage 1*c*, a groove extending from the first passage 2*a* to the outer edge of the piston main body 1*a* may be provided in the valve seat 1*d* such that the working fluid passes through this groove.

Next, when the piston speed enters a low speed region, the front-rear differential pressure of the leaf valve 10 reaches the valve-opening pressure, and as a result, the outer peripheral side of the leaf valve 10 bends as shown in FIG. 2, whereby the leaf valve 10 separates from the valve seat 1*d* and opens the first passage 2*a*.

In this case, the working fluid flowing between the leaf valve 10 and the valve seat 1*d* from the first passage 2*a* flows into the second passage 2*b* via the annular gap between the leaf valve 10 and the projecting portion 25*c* of the dam portion 25 and also via the through hole 10*a*.

Hence, when the piston speed is in the low speed region, the flow passage area is greater than in the very low speed region, in which the working fluid moves through the choke passage 1*c*, and since the bending amount of the leaf valve 10 also increases as the piston speed rises, the flow passage area is enlarged even further. Therefore, the damping characteristic when the piston speed is in the low speed region is such that although the damping force increases as the piston speed rises, the damping coefficient decreases, as shown in FIG. 4.

Figure 5:
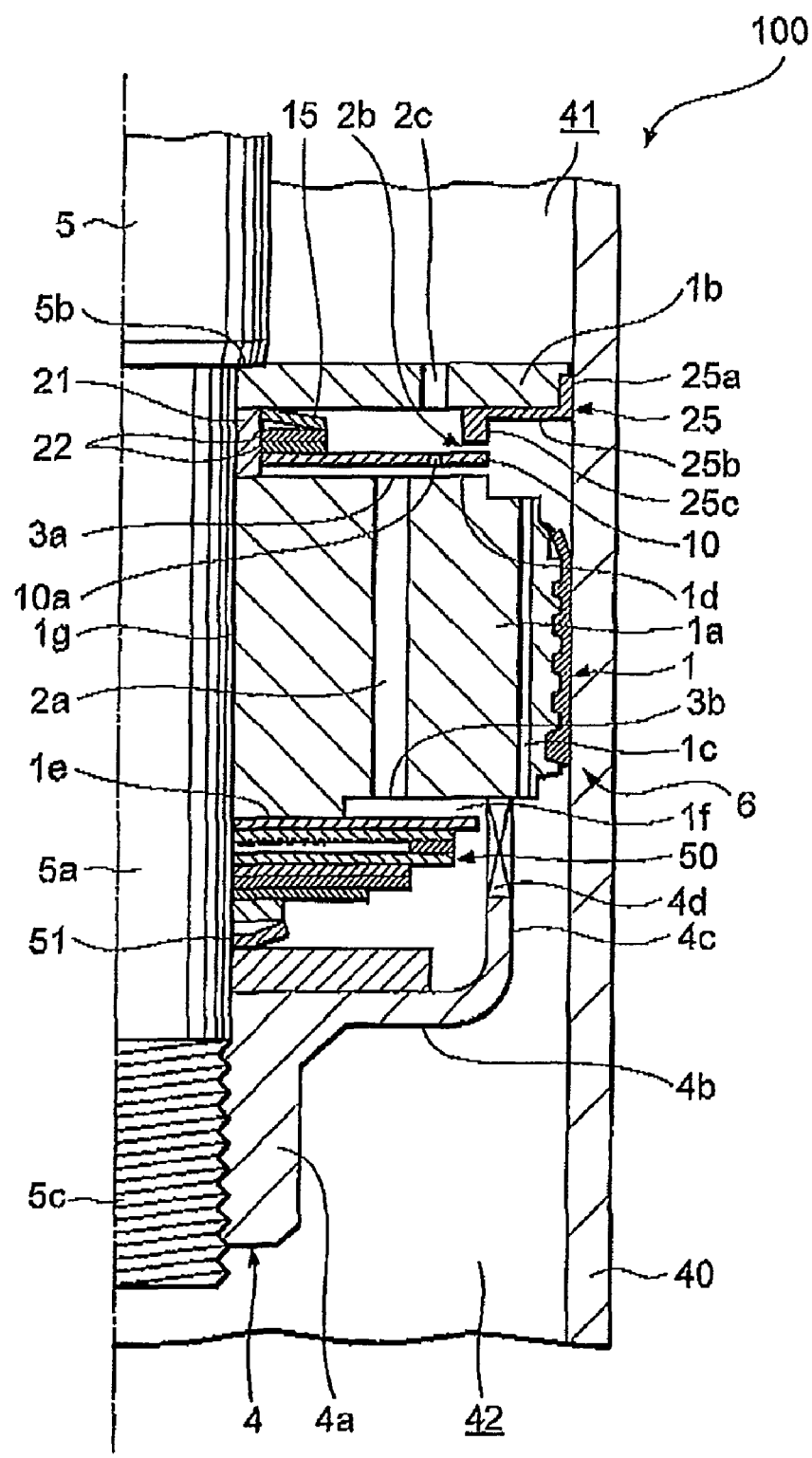
FIG. 5 is a longitudinal sectional view of the shock absorber according to an embodiment of this invention when the expansion/contraction speed of the shock absorber is in a medium speed region.

Next, when the piston speed enters a medium speed region, the front-rear differential pressure of the leaf valve 10 increases such that the entire leaf valve 10 moves in a direction away from the piston main body 1*a* against the biasing force of the plate spring 15, as shown in FIG. 5. The gap between the leaf valve 10 and the valve seat 1*d* increases in proportion to the piston speed. However, the leaf valve 10 does not come into contact with the projecting portion 25*c* of the dam portion 25, and therefore the annular gap between the leaf valve 10 and the projecting portion 25*c* is not closed. In other words, the second passage 2*b* is not closed.

Hence, as shown in FIG. 4, the damping characteristic when the piston speed is in the medium speed region is such that although the damping force increases as the piston speed rises, the damping coefficient decreases.

Next, when the piston speed enters a high speed region at or above a predetermined speed, the pressure in the pressure chamber 42 rises rapidly, causing the front-rear differential pressure of the leaf valve 10 to increase further such that the leaf valve 10 moves against the biasing force of the plate spring 15 to come into contact with the projecting portion 25*c* of the dam portion 25. Accordingly, the annular gap between the leaf valve 10 and the projecting portion 25*c* is closed, thereby closing the second passage 2*b*, and as a result, the first passage 2*a* communicates with the third passage 2*c* via the through hole 10*a* alone. Thus, the working fluid passage area decreases, leading to an increase in pressure loss as the working fluid passes through the piston 1.

Accordingly, in the damping characteristic when the piston speed is in the high speed region, the damping coefficient is larger than that of the medium speed region, as shown in FIG. 4.

The predetermined speed, which is the expansion/contraction speed of the shock absorber when the leaf valve 10 moves away from the piston main body 1*a* and comes into contact with the dam portion 25, may be adjusted according to the spring constant of the plate spring 15 and the bending rigidity of the leaf valve 10. In this embodiment, the predetermined speed is set at 1 m/s or more. In other words, the boundary between the medium speed region and the high speed region of the piston speed, at which the damping coefficient varies greatly, is set at 1 m/s or more. Furthermore, taking practicality into consideration, the predetermined speed is preferably set at no less than 1 m/s and no more than 2 m/s.

According to the embodiment described above, when the piston speed reaches the high speed region at or above the predetermined speed, the working fluid passage area decreases due to the contact between the leaf valve 10 and the dam portion 25, and therefore the damping coefficient can be increased in comparison with the medium speed region. Hence, even when the expansion/contraction speed of the shock absorber is high, the damping force does not become insufficient, and vibration in the vehicle can be suppressed sufficiently, enabling an improvement in the passenger comfort of the vehicle.

Furthermore, the damping coefficient only increases when the piston speed is in the high speed region at or above the predetermined speed, and during a normal operation of the vehicle when the piston speed is in the vicinity of the low and medium speed regions, variation in the damping force of the shock absorber is small. Therefore, the damping force is prevented from becoming excessively large during a normal operation, and the passenger comfort of the vehicle is not impaired.

Further, even under conditions in which the shock absorber expands and contracts maximally such that the amplitude is large and the expansion/contraction speed of the shock absorber reaches the high speed region, the damping force generated by the shock absorber can be increased, and therefore the expansion/contraction speed of the shock absorber can be reduced quickly so as to alleviate the impact of maximum expansion/contraction. Moreover, the load on a bump stopper rubber for alleviating the impact during maximum expansion/contraction of the shock absorber can be lightened, which contributes to an increase in the life of the bump stopper rubber.

Second Embodiment

Figure 6:
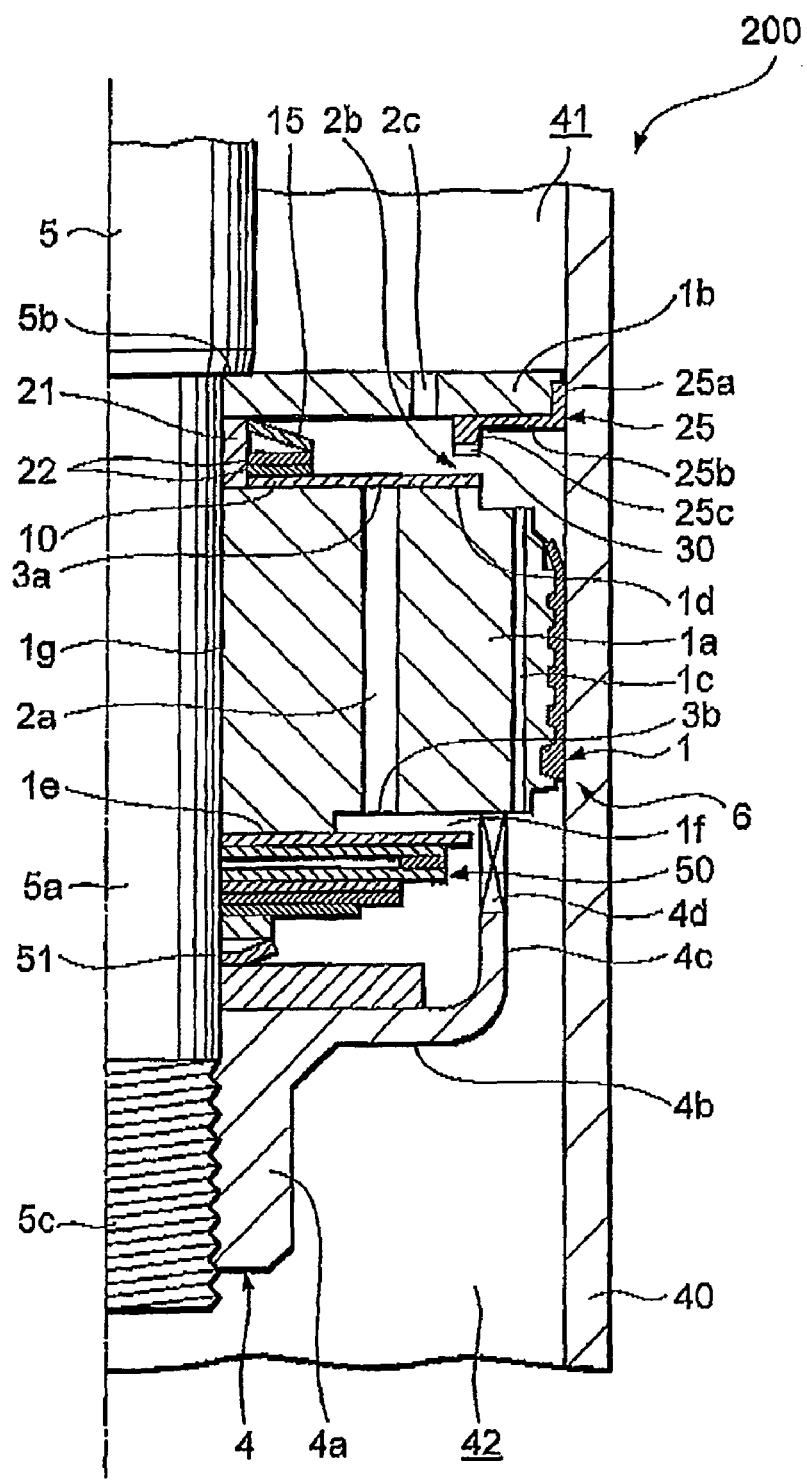
FIG. 6 is a longitudinal sectional view of a shock absorber according to another embodiment of this invention.

Next, referring to FIGS. 6 to 8, a shock absorber 200 according to a second embodiment of this invention will be described. It should be noted that identical members to those of the shock absorber 100 according to the first embodiment described above have been allocated identical reference symbols, and description thereof has been omitted.

The difference between the shock absorber 200 and the shock absorber 100 of the first embodiment is that in place of the through hole 10a in the leaf valve 10, a groove 30 is provided in the projecting portion 25c of the dam portion 25. The following description will focus on this difference.

Figure 7:
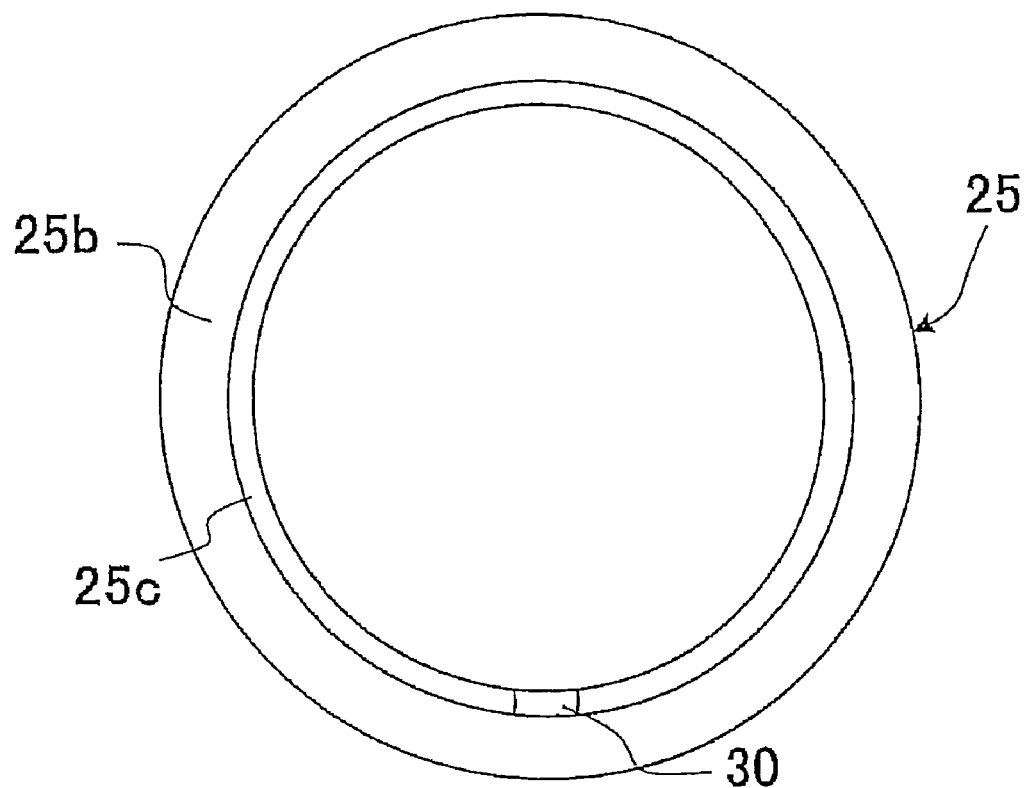
FIG. 7 is a plan view of a dam portion in a shock absorber according to another embodiment of this invention.

As shown in FIG. 7, the groove 30 is formed by cutting away a part of the annular projecting portion 25c.

When the shock absorber 200 performs a contraction operation such that the piston speed reaches the high speed region at or above the predetermined speed, the leaf valve 10 comes into contact with the projecting portion 25c. At this time, the annular gap between the leaf valve 10 and the projecting portion 25c is closed apart from the groove 30. In other words, working fluid from the first passage 2a communicates with the third passage 2c via the groove 30 alone. Therefore, the working fluid passage area decreases, leading to an increase in pressure loss as the working fluid passes through the piston 1.

Hence, in this embodiment, a similar damping characteristic to that of the first embodiment can be obtained when the piston speed is in the high speed region.

The number and depth dimension of the groove 30 may be determined according to the damping characteristic required by the shock absorber.

Figure 8:
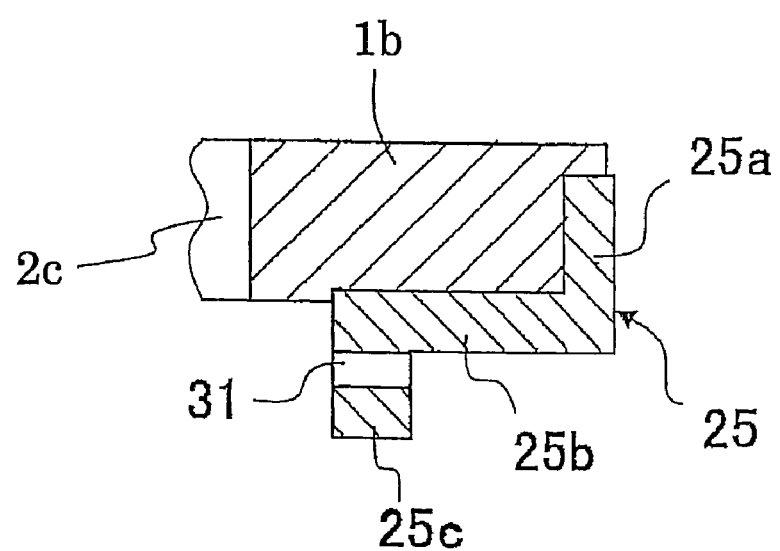
FIG. 8 is a sectional view of a dam portion in a shock absorber according to another embodiment of this invention.
Figure 9:
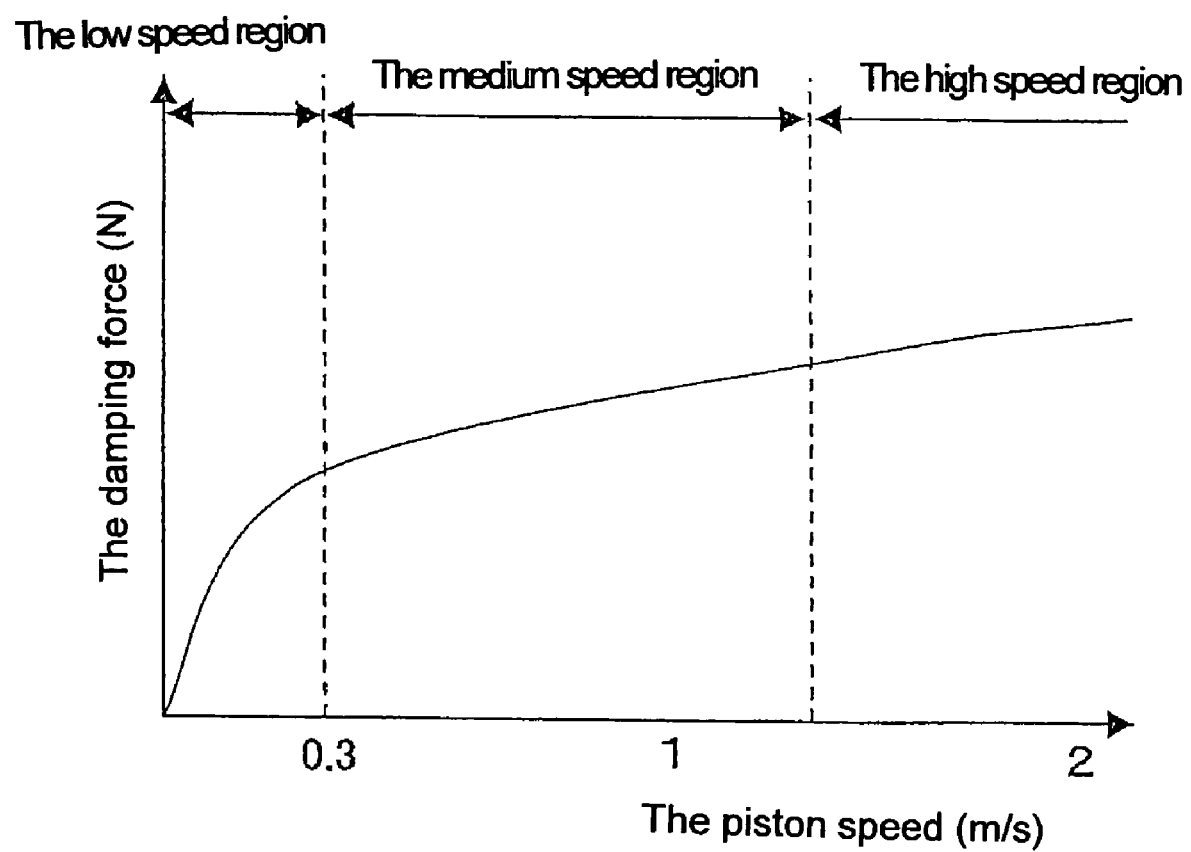
FIG. 9 is a graph showing the damping characteristic of a conventional shock absorber.

Further, as shown in FIG. 8, a hole 31 having an opening portion on the inner periphery and outer periphery of the projecting portion 25c may be provided in place of the groove 30.

This embodiment exhibits similar actions and effects to those of the first embodiment described above. In other words, when the piston speed reaches the high speed region at or above the predetermined speed, the working fluid passage area is reduced by the contact between the leaf valve 10 and the dam portion 25, and therefore the damping coefficient can be made larger than that of the medium speed region. Hence, even when the expansion/contraction speed of the shock absorber is high, the damping force does not become insufficient, and vibration in the vehicle can be suppressed sufficiently, enabling an improvement in the passenger comfort of the vehicle.

In the above description, this invention was applied to a contraction-side damping valve that generates a damping force during a contraction operation of a shock absorber. However, this invention may also be applied to an expansion-side damping valve that generates a damping force during an expansion operation of the shock absorber, and may also be applied to damping valves on both the contraction side and the expansion side. Furthermore, this invention may be applied to another valve of a shock absorber, such as a base valve.

This invention is not limited to the embodiments described above, and may of course be subjected to various modifications within the scope of the technical spirit thereof.

INDUSTRIAL APPLICABILITY

This invention may be applied to a shock absorber interposed between a vehicle body and an axle of a vehicle.

The invention claimed is:

1. A shock absorber for suppressing vibration in a vehicle, comprising:
a cylinder in which a working fluid is sealed;
a valve disk that delimits an interior of the cylinder, the valve disk forming a first passage, a second passage and a third passage disposed in series so as to connect pressure chambers delimited by the valve disk, the valve disk being a piston which is connected to one end of a rod that inserts and withdraws from the interior of the cylinder, and moves slidingly through the interior of the cylinder, the piston including
a ring body latched to the rod and an outer periphery of the ring body being provided in sliding contact with the interior of the cylinder, and
a piston main body, the first passage being formed to penetrate the piston main body, and the third passage being formed to penetrate the ring body;
a valve body that is disposed between the first passage and the second passage, the valve body selectively opening the first passage and the second passage, the valve body closing the first passage by coming into contact with a seat surface of the piston main body, and closing the second passage by coming into contact with a seat surface of the ring body;
a biasing member that biases the valve body against a pressure in a first of the pressure chambers and in a direction for closing the first passage, the piston main body compressing the biasing member between the ring body and the piston main body; and
a bypass passage that connects the first passage to the third passage when the valve body is displaced from the pressure in the first pressure chamber so as to open the first passage and close the second passage, the bypass passage being formed to penetrate the valve body and remains closed when the valve body comes into contact with the seat surface of the piston main body,
further in a first instance the valve body bends from the pressure in the first pressure chamber and opens the first passage, the first passage connects to the third passage through both the second passage and the bypass passage, and in a second instance the valve body moves from the pressure in the first pressure chamber and against the biasing force of the biasing member so as to close the second passage, the first passage connects to the third passage through only the bypass passage.

2. The shock absorber as defined in claim 1, wherein when the shock absorber moves in a direction for reducing a volume of the one pressure chamber and a movement speed thereof reaches or exceeds a predetermined value, the valve body moves against the biasing force of the biasing member to come into contact with the seat surface of the ring body.

3. The shock absorber as defined in claim 1, wherein a choke passage that bypasses the first passage is provided in the piston main body.

4. The shock absorber as defined in claim 1, wherein in the first instance the shock absorber has a lower damping coefficient than in the second instance.

5. The shock absorber as defined in claim 4, wherein in the first instance, a speed of the valve body is less than in the second instance.

6. The shock absorber as defined in claim 1, wherein the third passage is the only passage formed in the ring body.

* * * * *